United States Patent [19]

Kurihara et al.

[11] Patent Number: 5,058,128
[45] Date of Patent: Oct. 15, 1991

[54] SPREAD SPECTRUM COMMUNICATION RECEIVER

[75] Inventors: Takao Kurihara; Masahiro Hamatsu, both of Tokyo, Japan

[73] Assignee: Clarion Co., Ltd., Tokyo, Japan

[21] Appl. No.: 485,471

[22] Filed: Feb. 27, 1990

[30] Foreign Application Priority Data

Feb. 28, 1989 [JP] Japan .................................... 1-46855
Feb. 28, 1989 [JP] Japan .................................... 1-46856
Mar. 1, 1989 [JP] Japan .................................... 1-49510

[51] Int. Cl.$^5$ .......................... H04L 27/30; H04L 7/00
[52] U.S. Cl. ........................................ 375/1; 375/115; 375/116
[58] Field of Search .......................... 375/111, 114-120

[56] References Cited

U.S. PATENT DOCUMENTS 4,875,221 10/1989 Mori .......................................... 375/1
4,943,975 7/1990 Kurihara et al. ....................... 375/1

FOREIGN PATENT DOCUMENTS 64-11178 2/1989 Japan .

Primary Examiner—Bernarr E. Gregory
Attorney, Agent, or Firm—Flynn, Thiel, Boutell & Tanis

[57] ABSTRACT

An SSC receiver, in which desired information is restored by means of a correlator, which forms the correlation between a received PN code included in a received signal and a reference PN code included in a reference signal, is disclosed, wherein it is so constructed that the output of the correlator stated above is inputted in pattern judging means, that in the case where no accordance with a predetermined judgment pattern is obtained, when a certain period of time has elapsed, judgment patterns, which are analogous to the predetermined judgment pattern stated above, are switched over one after another, every time a predetermined period of time has elapsed, and that the position, where the two codes are in accordance with each other, is set correctly by controlling the phase of the reference PN code by using the output, when the output of the correlator described above is in accordance with either one of the judgment patterns.

20 Claims, 13 Drawing Sheets

SPREAD SPECTRUM COMMUNICATION RECEIVER

FIELD OF THE INVENTION

The present invention relates to a receiver used in the spread spectrum communication (hereinbelow abbreviated to SSC).

BACKGROUND OF THE INVENTION

As an SSC receiver, there are known those described e.g. in JP-B-64-11178 and U.S. patent application Ser. No. 256,394 filed Oct. 7, 1988 (now U.S. Pat. No. 4,943,975).

Between those described above, it is that described in the latter U.S. patent application, which the present invention relates to. In an SSC receiver according to this system, in which desired information is restored by means of a correlator forming the correlation between a received pseudo noise (hereinbelow abbreviated to PN) code included in a received signal and a reference PN code included in a reference signal generated on the receiver side, the output of the correlator stated above is inputted in pattern judging means and the operation of the initial synchronization for setting correctly the position, where the two codes described above are in accordance with each other, is effected by controlling the phase of the reference PN code by using the output, obtained when the output of the correlator is in accordance with a predetermined judgment pattern.

Further sampling pulses are generated in time before and after a correlation pulse produced by a correlation spike outputted by the correlator describe above. In this way, the correlation pulse is sampled and the direction and the amount of the deviation are detected. The phase of the reference PN code is controlled by using a phase control pulse corresponding to them so as to hold the two codes stated above in synchronism. The data are restored by extracting the correlation pulse in a period from the rising edge of the sampling pulse preceding in time to the falling edge of the sampling pulse succeeding in time between these two sampling pulses described above.

However this technique has a drawback that the operation of the initial synchronization is not effected, until the quality of the electromagnetic wave propagation path is restored, when the quality of the electromagnetic wave propagation path is worsened and it is difficult to make the output of the correlation be in accordance with the predetermined judgment pattern stated above, because the predetermined judgment pattern is fixed.

Further, in the case where errors in the code clock frequency of the two codes are remarkable, the correlation pulse has a tendency to be deviated towards either one of the two sampling pulses. Consequently the technique described above has another problem that the extraction between the two sampling pulses becomes unstable.

OBJECT OF THE INVENTION

An object of the present invention is to provide an SSC receiver by the packet communication method capable of solving the problem that the operation of the initial synchronization cannot be effected, until the quality of the electromagnetic wave propagation path is restored, when the quality of the electromagnetic wave propagation path is worsened and it is difficult to make the output of the correlator be in accordance with the predetermined judgment pattern stated above.

Another object of the present invention is to provide an SSC receiver capable of restoring data by extracting stably the correlation pulse described above, even in the case where the errors in the code clock frequency of the two codes are remarkable.

SUMMARY OF THE INVENTION

In order to achieve the above objects, an SSC receiver according to the present invention is characterized in that it comprises a reference PN generator generating a reference PN code; correlating means for obtaining the correlation between the received PN code included in a received signal and the reference PN code stated above; a demodulator for restoring desired information from the correlating means stated above; pattern judging means comparing the output of the correlator stated above with a predetermined judgment pattern to obtain a detection output, when they are in accordance with each other; means for switching over the judgment pattern stated above to another judgment pattern analogous thereto, when the detection output stated above is not obtained in a predetermined period of time; and phase control means for controlling the phase of the reference PN code stated above on the basis of the detection output stated above to set correctly the position, where the received PN code and the reference PN code stated above are in accordance with each other.

Another spread spectrum communication receiver according to the present invention is characterized in that it comprises a reference PN code generator generating a reference PN code; correlating means for obtaining the correlation between the received PN code included in a received signal and the reference PN code stated above; phase control means for generating sampling pulses in time before and after a correlation pulse outputted by the correlating means stated above, detecting a deviation signal indicating the direction and the amount of the deviation on the basis of the correlation signal and the sampling pulses stated above, and controlling the phase of the reference PN code by using a phase control pulse corresponding to the deviation signal stated above; counting means for counting the number of the output of the deviation pulse stated above; and means for modifying the amount of the phase control of the reference PN code stated above for the phase control pulse outputted by the phase control means on the basis of the counting means stated above.

Still another spread spectrum communication receiver according to the present invention is characterized in that it comprises a reference PN code generator generating a reference PN code; correlating means for obtaining the correlation between the received PN code included in a received signal and the reference PN code stated above; phase control means for generating sampling pulses in time before and after a correlation pulse outputted by the correlating means stated above, detecting a deviation signal indicating the direction and the amount of the deviation on the basis of the correlation signal and the sampling pulses stated above, and controlling the phase of the reference PN code stated above by using a phase control pulse corresponding to the deviation signal stated above; means for generating a window pulse, which rises with the timing of one preceding in time of the correlation signals stated above and falls with the timing of one succeeding in time thereof; counting means for counting the number of the output of the deviation pulse stated above; window pulse modifying means for modifying the generation timing of the window pulse stated above on the basis of the counting means stated above; and means for restoring data by extracting the correlation pulse stated above on the basis of the window pulse stated above.

DETAILED DESCRIPTION

Figure 1:
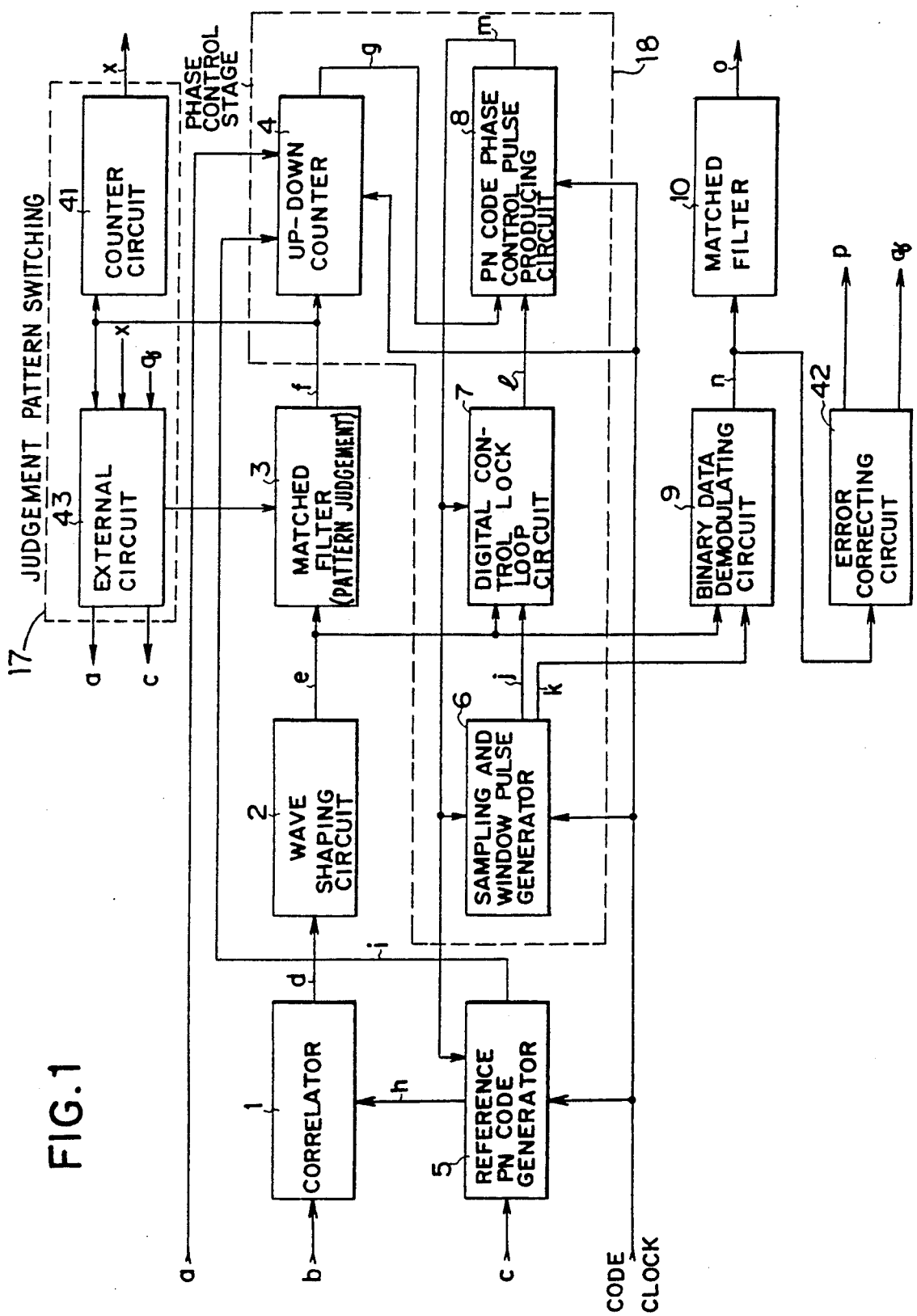
FIG. 1 is a block diagram showing an embodiment of the present invention.

FIG. 1 shows an embodiment of the SSC receiver according to the present invention, in which reference numeral 1 is a correlator; 2 is a wave shaping circuit; 3 is a first matched filter; 4 is an up-down counter; 5 is a reference PN code generator; 6 is a sampling pulse and window pulse generator; 7 is a digital phase locked loop circuit; 8 is a PN code phase control pulse producing circuit; 9 is a demodulating circuit; 10 is a second matched filter; 41 is a counter circuit; 42 is an error correcting circuit; and 43 is an external circuit. Said counter 4, generators 5 and 6, and circuits 7 and 8 operate as a phase control stage.

An error correcting circuit is described e.g. in "Development of an error correcting method for broadcasting letters and characters by a coded transmission method" by YAMADA et al., NHK TECHNICAL JOURNAL, Vol. 37, No. 1. Ser. No. 167 (1985).

In FIG. 1, the wave shaping circuit 2 generates correlation pulses (e) while separating correlation spikes (d) produced in the correlator 1, when the received PN code and the reference PN code (h) are in accordance with each other, and appearing at the neighborhood thereof, into the positive and the negative side. The first matched filter 3 serves as a pattern judging arrangement which outputs a pulse (f) (initial synchronization detection signal), when the pattern of the correlation pulses (e) outputted by the wave shaping circuit 2 is in accordance with a predetermined judgment pattern.

However, when no pulse (f) is outputted over a predetermined period after the beginning of the reception operation, a judgment pattern switching arrangement 17 which includes a counter 41 and an external circuit sets judgment patterns one after another, which are analogous to the predetermined judgment pattern described above, at the first matched filter 3, while switching over them for every certain elapsed period of time measured by counter 41 during which no pulse (f) is obtained.

The up-down counter 4 is initialized by a strobe pulse outputted by the reference PN code generator 5 and effects up count, starting from an offset value (a) set by an external circuit such as e.g. a microprocessor, etc. When the pulse (f) is outputted by the first matched filter, the up-down counter 4 is triggered by it to effect down count and generates a borrow pulse (g).

The reference PN code generator 5 outputs a reference PN code (h) and a strobe pulse (i) indicating the first bit thereof on the basis of the initial information (c) of the reference PN code set by the external circuit.

The sampling and window pulse generator 6 outputs a sampling pulse (j) and a window pulse (k) for sampling and extracting correlation pulses (e) outputted by the wave shaping circuit 2. The digital phase lock loop circuit 7 holds the synchronization between the received PN code included in the received signal (b) inputted in the correlator 1 and the reference PN code (h) included in the reference signal.

The PN code phase control pulse generating circuit 8 is triggered by the pulses (g) and (l) outputted by the up down counter 4 and the digital phase lock loop 7, respectively, to output a phase control pulse (m) for the reference PN code (h). The demodulating circuit 9 restores two-valued data by using the correlation pulse outputted by the wave shaping circuit 2 and the window pulse (k) outputted by the sampling and window pulse generator 6. The second matched filter 10 outputs a pulse (o), when the two-valued data outputted by the demodulating circuit 9 are in accordance with a predetermined pattern.

The elements 4, 6, 7 and 8 together constitute a phase control arrangement 18. As described above, when information data are restored, since the external circuit detects the error correction state and influences of noise, etc. are reduced, as the state becomes better, the received data are returned to the predetermined pattern.

Further the various circuits described above are triggered by reception operation starting pulses outputted by the external circuit so that they start their respective operations.

The operation of the embodiment of the present invention described above will be explained more in detail. In order to facilitate the explanation, a case where one period of the PN code is equal to the length of data bits and the integration domain by means of the correlator 1 is equal to one period of the PN code is taken as an example.

Figure 2:
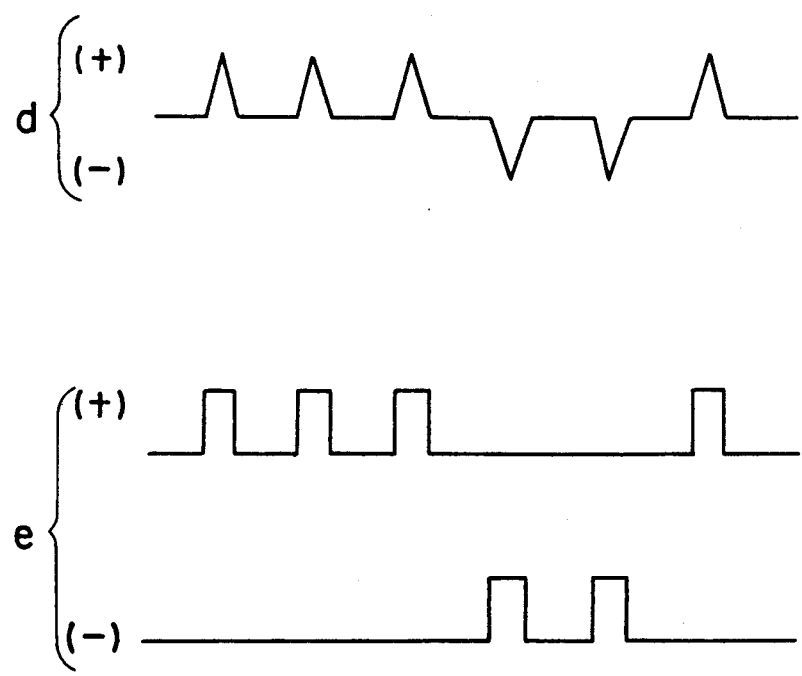
FIG. 2 is a timing chart for explaining the operation of the wave shaping circuit in the embodiment indicated in FIG. 1.

When a reception operation starting pulse is outputted by the external circuit, the reference PN code generator 5 gives the correlator 1 the reference PN code (h) included in the reference signal on the basis of the initial information (c) of the PN code set by the external circuit. When the SSC signal is received and the received PN code included in the received signal (b) is in accordance with the reference PN code (h), a correlation spike (d) is outputted to the wave shaping circuit 2 by the correlator 1. The wave shaping circuit 2 separates correlation spikes (d) into those on the positive side and those on the negative side, as indicated in FIG. 2, to generate correlation pulses (e), which are given to the first matched filter 3, the digital phase lock loop 7 and the demodulating circuit 9.

Figure 17A:
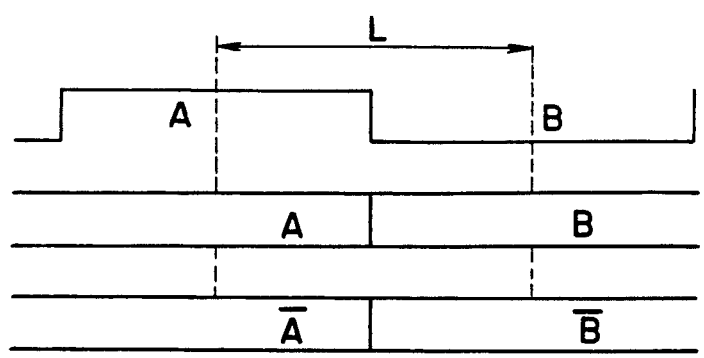
FIGS. 17A and 17B are schemes indicating that the received PN code and the reference PN code should be in a correct positional relation.

However, as described above, it is unknown where the two PN codes stated above are in accordance with each other. Therefore, unless the position where the two codes are in accordance with each other is set correctly, it is not possible to restore correctly the received data. For example, in the case where the two codes are in accordance with each other in the form indicated in FIG. 17A, data bits A are in a half of the received code and data bits B are in the other half thereof. In the figure are indicated from the above the arrangement of the data bits, the received PN code and the reference PN code, in which the region indicated by L represents the integration domain, in which the correlation operation is effected by means of the correlator 1. A PN code $\overline{A}$ is a code obtained by inverting a PN code A in time.

Figure 17B:
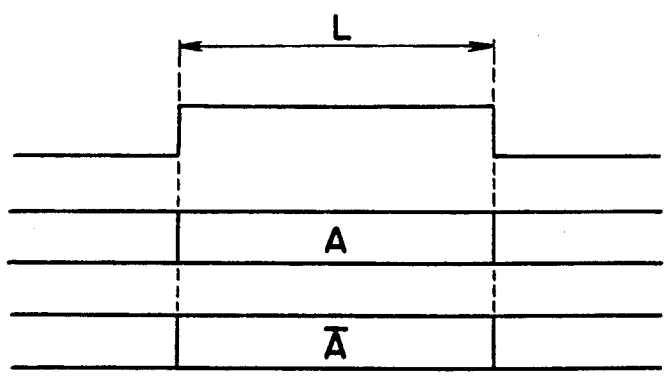

As explained above, wherever the received code and the reference code are in accordance with each other, it is necessary to carry out the initial synchronization so that they are in accordance with each other finally at the position as indicated in FIG. 17B. According to the present invention the operation for this initial synchronization is effected as follows.

Figure 9A:
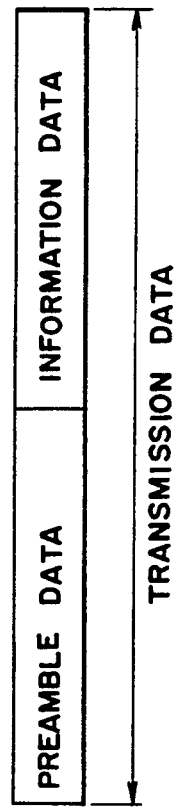
FIGS. 9A and 9B are schemes illustrating the structure of transmitted data and preamble data, respectively.

The transmitted data consist of preamble data and information data, as indicated in FIG. 9A.

The transmitted data consist of preamble data and information data, as indicated in FIG. 9A, and further the preamble data include an initial synchronization pattern and an information data start timing detection pattern. The correlation pulse (e) outputted by the wave shaping circuit 2 is inputted in the first matched filter 3. The first matched filter 3 outputs the pulse (f) to the up-down counter 4, when the pattern of the correlation pulse (e) is in accordance with the set predetermined pattern.

Figure 3:
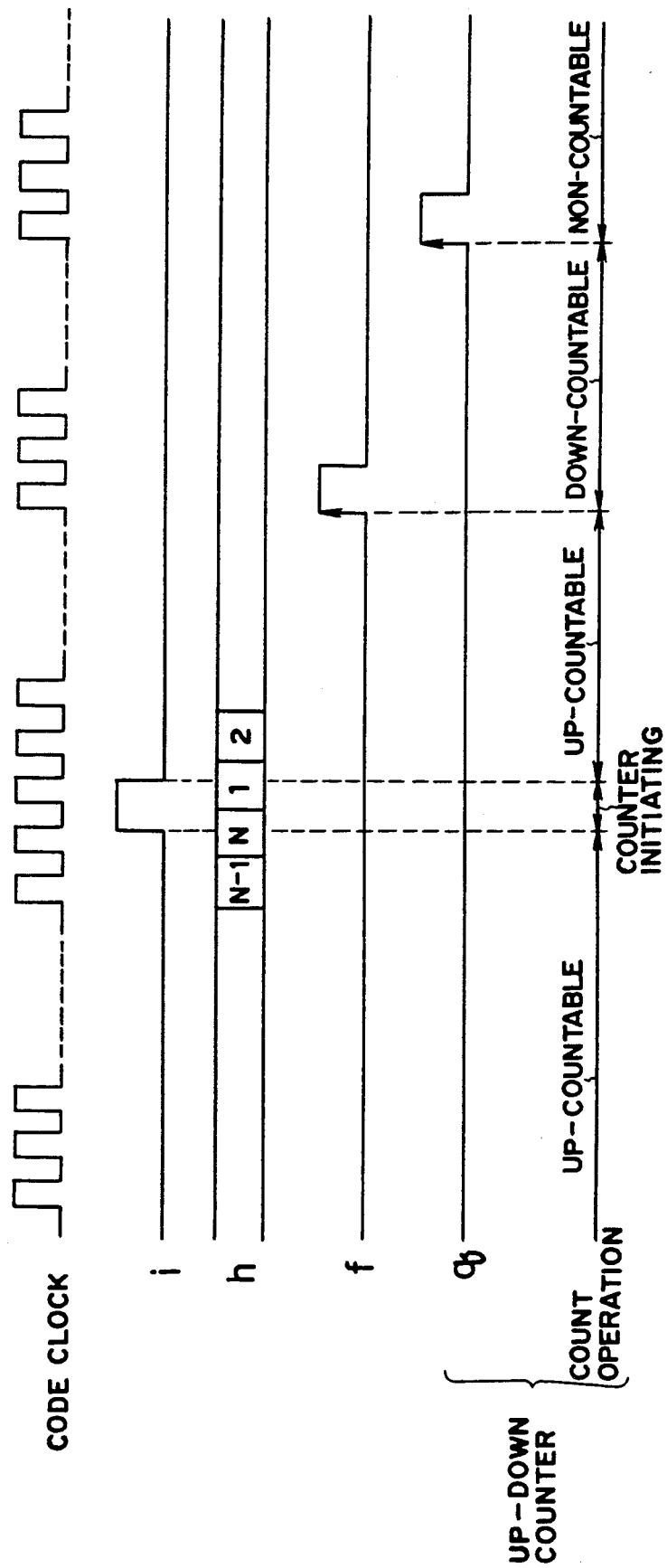
FIG. 3 is a timing chart for explaining the operation of the initial synchronization in the embodiment indicated in FIG. 1.

The up-down counter 4 is initialized by the strobe pulse (i) indicating the starting bit of the reference PN code (h) outputted by the reference PN code generator 5, until the pulse (f) is outputted by the first matched filter 3, as indicated in FIG. 3, and repeats the up count, starting from the offset value set by the external circuit. When the pulse (f) is outputted by the first matched filter 3, the up-down counter 4 is switched over from the up count to the down count with the timing of the pulse stated above and when the count value of the counter 4 reaches 0, the borrow pulse (g) is outputted to the PN code phase control pulse generating circuit 8.

The PN code phase control pulse generating circuit 8 is triggered by the borrow pulse (g) stated above to output the phase control pulse (m) for the reference PN code (h) to the reference PN code generator 5, the sampling and window pulse generator 6 and the digital phase lock loop circuit.

By a series of the operations described above the received PN code is made finally be in accordance with the reference PN code (h).

Figure 4:
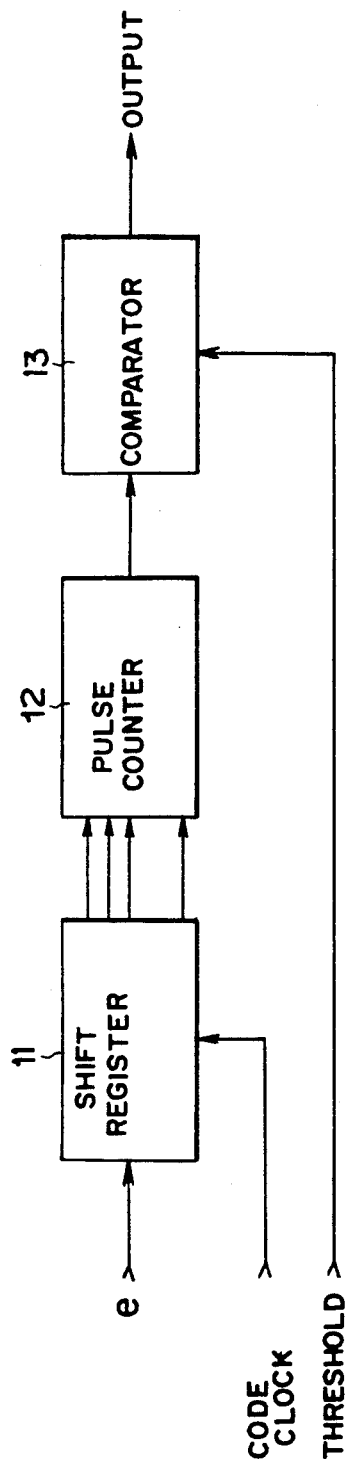
FIGS. 4, 5 and 6 are block diagrams indicating an example of the construction of the first matched filter in the embodiment indicated in FIG. 1.
Figure 5:
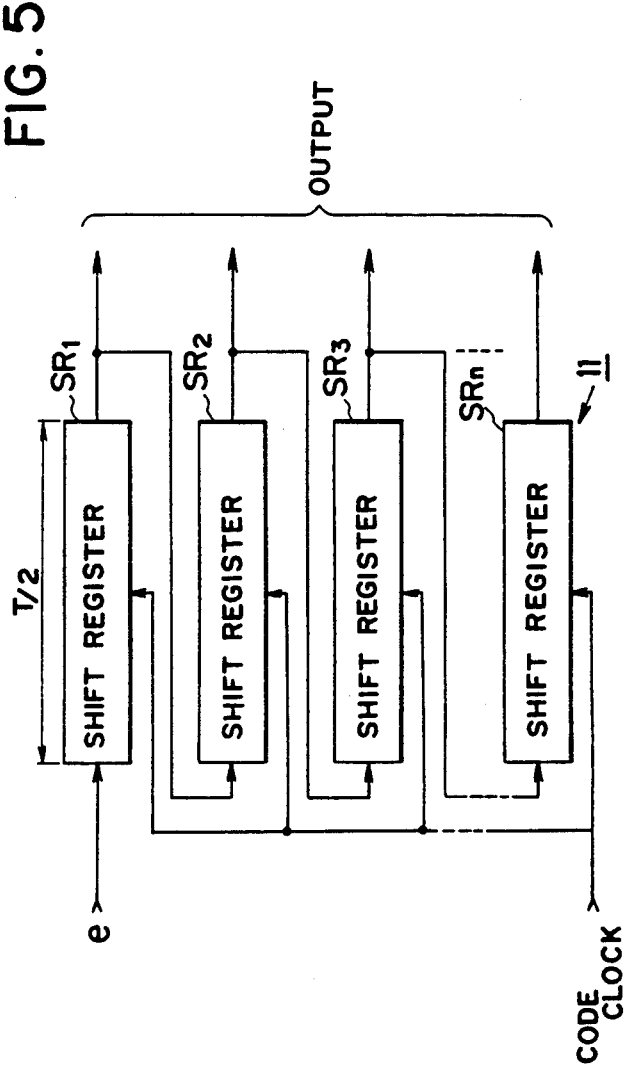
Figure 6:
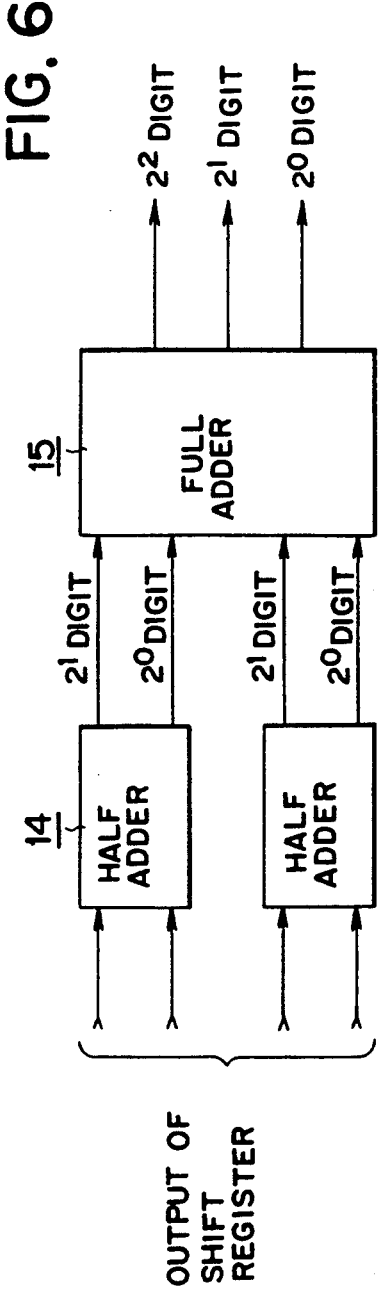

FIGS. 4, 5 and 6 show an example of the construction of the first matched filter 3.

In FIG. 4, reference numeral 11 is a shift register; 12 is a pulse counter; and 13 is a comparator.

The shift register 11 consists of a plurality of shift registers $SR_1$ to $SR_n$ connected in series, as indicated in FIG. 5. Each of the shift registers is driven by a code clock and an output terminal is disposed for every predetermined length, which is given to the pulse counter 12.

The pulse counter 12 counts the total number of pulses outputted in parallel by the different shift registers and outputs it to the comparator 13 after having converted it into binary data. This pulse counter 12 consists of e.g. a plurality of half adders 14 and a full adder 15, as indicated in FIG. 6.

The parallel outputs of the different shift registers are paired and inputted in the half adders 14 to be half-added there. The addition output obtained as the result is converted into binary data by assigning it to the $2^0$ digit and the carry output thereof to the $2^1$ digit.

Further all the results thus converted into binary data are inputted in the full adder 15 to be added there. In this way, the total number of the pulses outputted in parallel by the shift register 11 is converted into binary data.

The comparator 13 compares the binary data outputted by the pulse counter 12 with the threshold value set by the external circuit and outputs a pulse, when the binary data reach the threshold value.

In the first matched filter 3 thus constructed, e.g. in the case where all the elements of the transmitted data pattern for the initial synchronization are "1", a correlation spike on the positive side is produced. That is, the correlation spike on the positive side is produced with a period, which is equal to a half of the period of time T (hereinbelow called delay time) corresponding to the integration domain of the correlator 1, and no correlation spike is produced on the negative side. Consequently correlation spikes on the positive side are produced by the wave shaping circuit 2 with a period, which is equal to that of the correlation pulse, while no correlation spike is produced on the negative side.

This correlation spike is inputted in the shift register 11 and in this shift register 11 there are disposed an output terminal for every ½ of the delay time, as indicated in FIG. 5. Consequently, if a normal signal is received, pulses are outputted in parallel by the shift register 11, while increasing for every ½ of the delay time T, and converted into the binary data by the pulse counter 12, as described previously. Thereafter, when the value thereof reaches the threshold value set in the comparator 13 by the external circuit, the comparator 13 outputs a pulse.

However, if the value of the binary data outputted by the pulse counter 12 does not reach the initial threshold value set in the comparator 13 by the external circuit and no pulse is outputted, while a certain period of time set by the external circuit 43 is counted by the counting circuit 41, a time expiration detection pulse (x) is outputted to the external circuit 43 by the counting circuit 41. When the time expiration detection pulse (x) is outputted by the counting circuit 41, the external circuit 43 repeats to vary the threshold values set in the comparator 13 one after another, until the pulse from the comparator 13 is obtained.

Thereafter, as the information data are restored, the external circuit detects the number of errors (q) outputted by the error correcting circuit 42. Since influences of noise, etc. are reduced, as the number of errors decreases, the threshold value set in the comparator 13 is returned to the initial threshold value.

Figure 10:
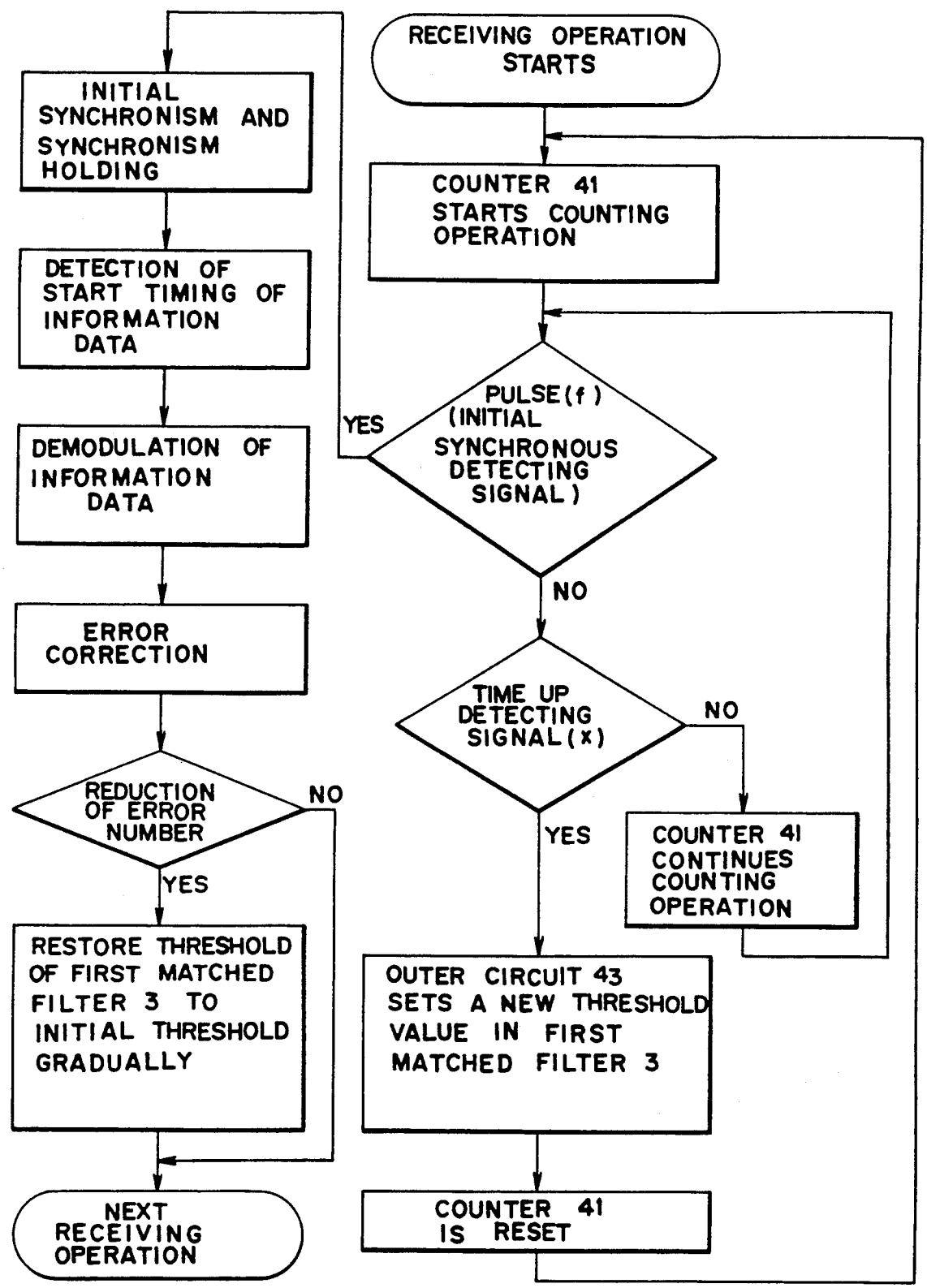
FIG. 10 is a flowchart for explaining the operation of the present invention.

FIG. 10 is a flow chart for explaining the operation described above.

Owing to the construction of the first matched filter 3 described above, even if anomalies are produced in the output of the correlator 1 because of noise, etc., it is possible to have matching only for normal correlation pulses.

Further the interval between two adjacent output terminals set in the plurality of shift registers $SR_l$ to $SR_n$ constituting the shift register 11 can be modified, corresponding to the transmitted data pattern for the initial synchronization.

Figure 7:
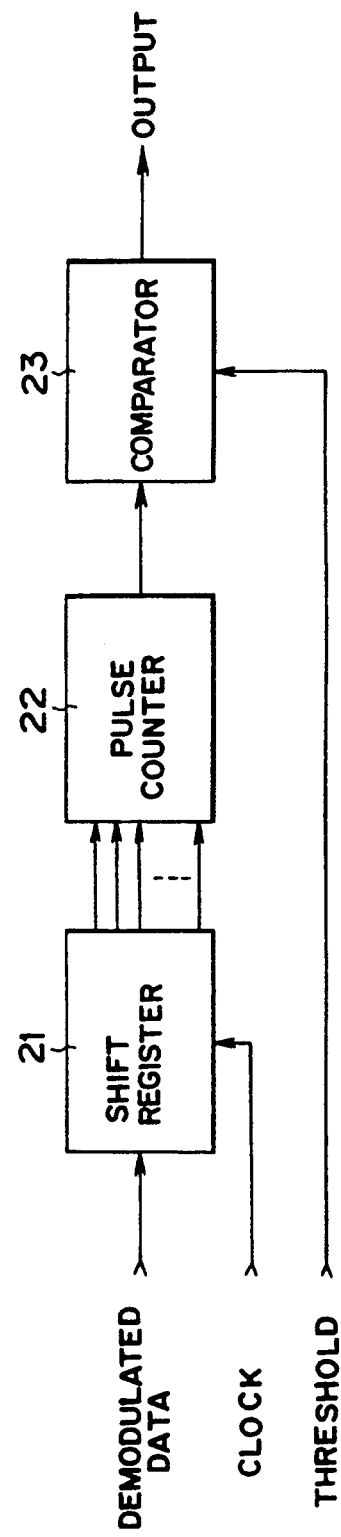
FIGS. 7 and 8 are block diagrams indicating an example of the construction of the second matched filter in the embodiment indicated in FIG. 1.
Figure 8:
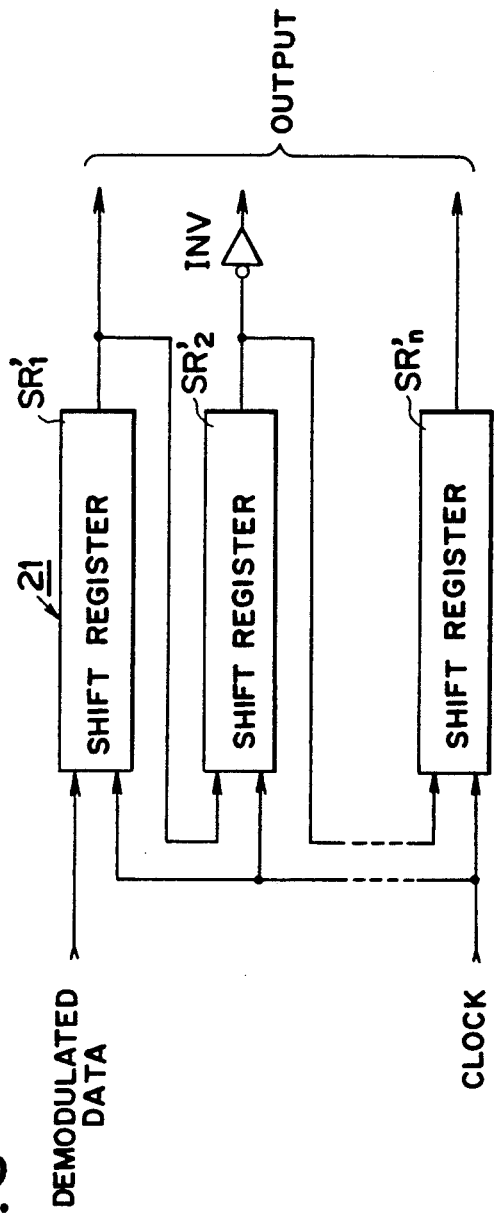

FIGS. 7 and 8 show an example of the construction of the second matched filter 10. In FIG. 7, reference numeral 21 is a shift register; 22 is a pulse counter; and 23 is a comparator.

The shift register 21 consists of a plurality of shift registers $SR_l'$ to $SR_n'$ connected in series, as indicated in FIG. 8, and it is driven by a clock having a period, which is equal to the length of 1 set of data bits. In each of the shift registers there is disposed one output terminal.

Figure 9B:
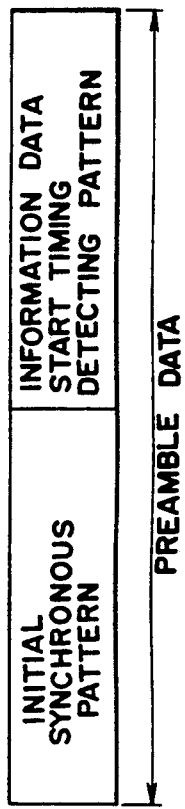

The restored data are inputted in the shift register 21. An inverter INV is connected suitably with the output of each of the shift registers so that pulses are outputted by all of the shift registers $SR_l'$ to $SR_n'$, when the restored data are in accordance with the pattern set for detecting the start timing of the information data included in the preamble data, as indicated in FIG. 9B. The output of each of the shift registers is outputted to the pulse counter 22.

The pulse counter 22 and the comparator 23 are constructed in the same manner as those described previously. The pulse counter 22 counts the total number of pulses outputted by the shift register 21 and converts it into binary data to output it to the comparator 23. The comparator 23 compares these binary data with the threshold value set by the external circuit 43 and outputs a pulse, when the binary data reach the threshold value.

Figure 11:
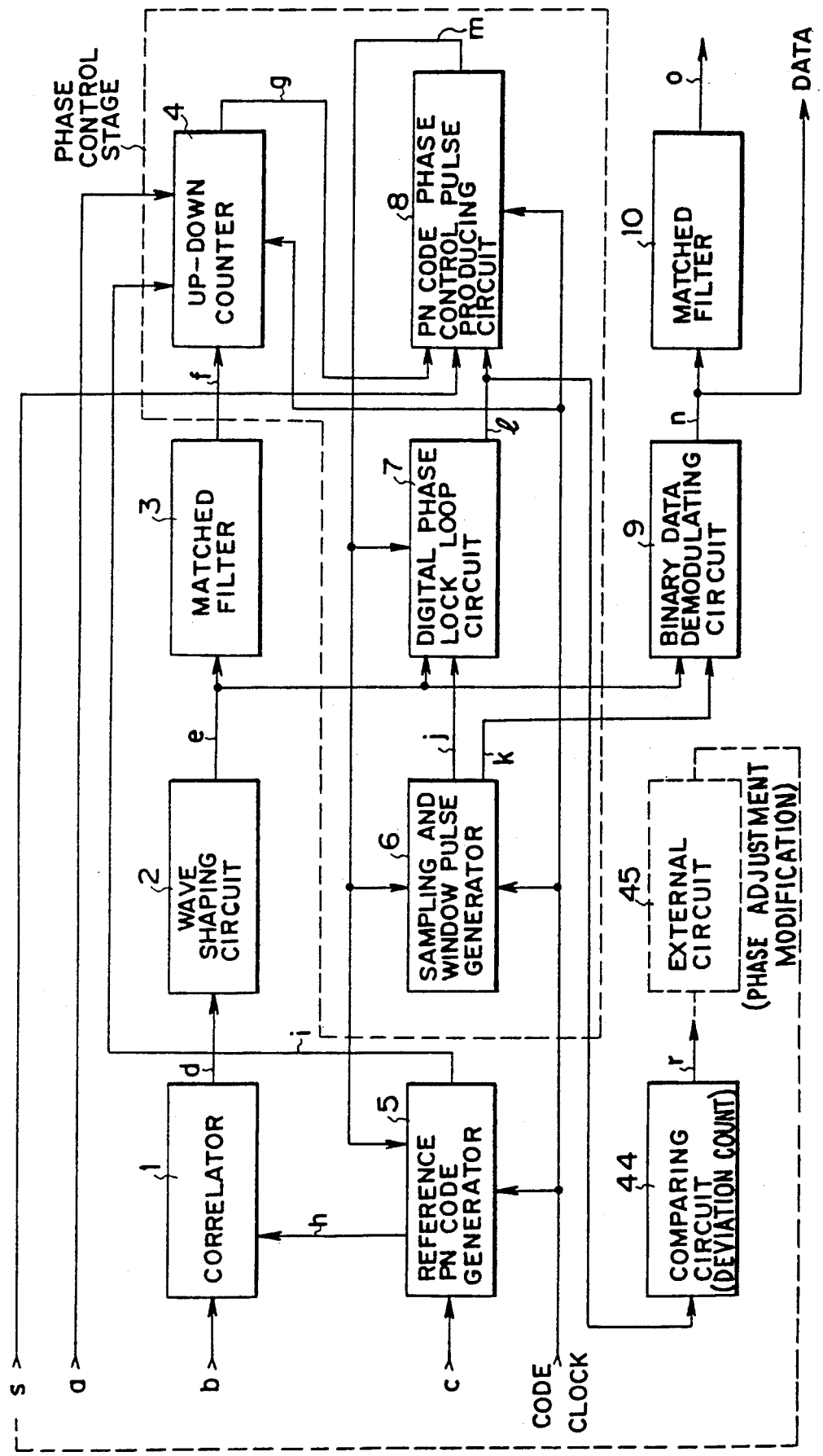
FIG. 11 is a block diagram showing another embodiment of the present invention.
Figure 12:
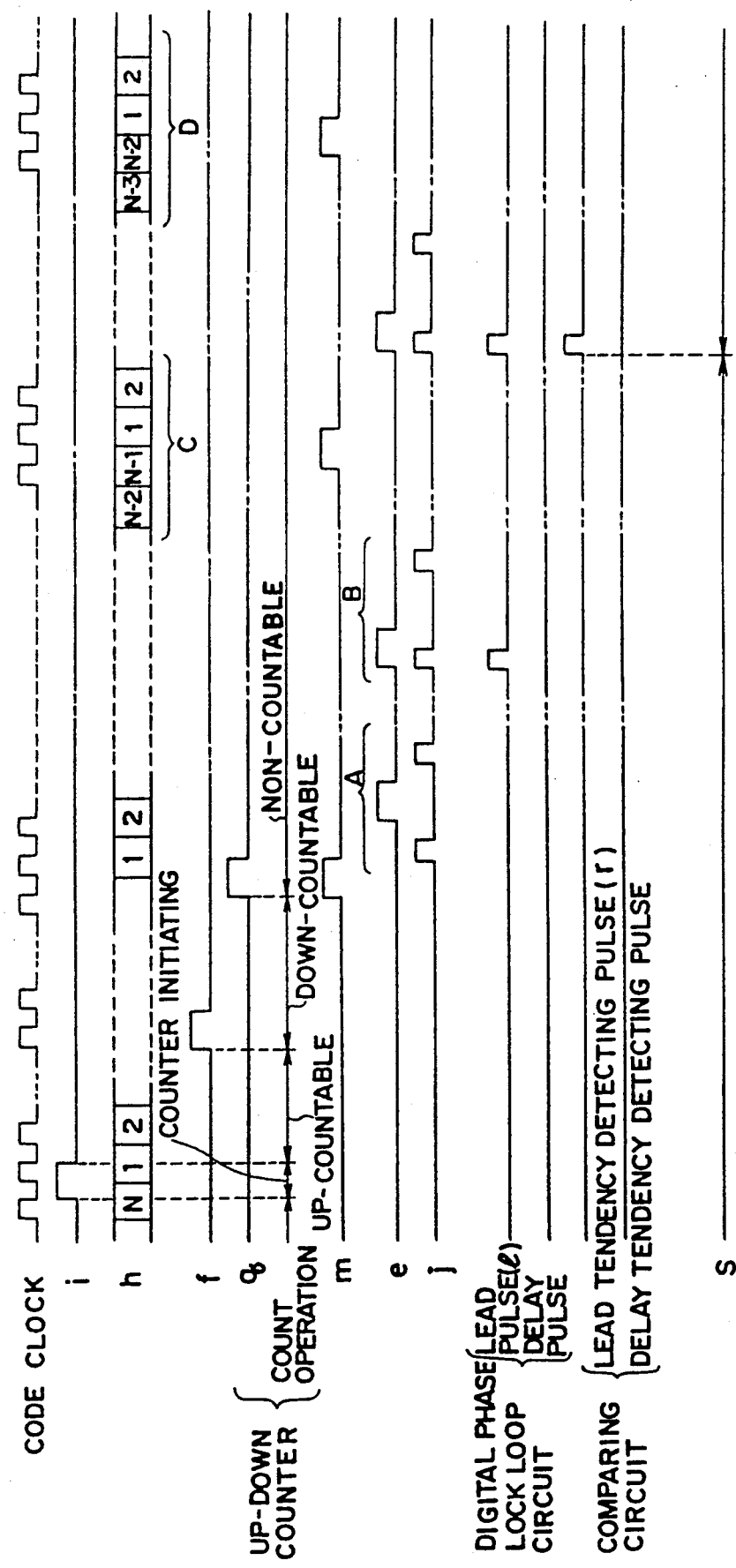
FIG. 12 is a timing chart for explaining the synchronization holding operation in the embodiment indicated in FIG. 11.

FIG. 11 shows another embodiment of the present invention, in which the reference numerals identical to those used in FIG. 1 represent identical or analogous circuits. In FIG. 11, 44 is a comparing circuit; 45 is an external circuit; r is a deviation direction detection pulse; and s is a PN code phase control amount. The basic operation is identical to that of the embodiment indicated in FIG. 1 and only operations peculiar to this embodiment will be explained below. FIG. 12 is a timing chart for explaining the operation of the initial synchronization in the present embodiment.

Now, by the method described previously, the initial synchronization is established and the two codes are in the predetermined positional relationship.

However, in the case where there are errors in the code clock frequency between the two codes, the position, where the two codes are in accordance with each other, is displaced gradually from the positional relationship stated above. That is, even if the initial synchronization is established, when the two codes are different in the code clock frequency, the position, where the two codes are in accordance with each other, is displaced gradually from the normal position.

For this reason, according to the present invention, in order to correct errors in the phase and to hold the synchronization, the following measures are taken.

The sampling pulse and window pulse generator 6 and the digital phase lock loop circuit 7 are initialized by the phase control pulse (m) of the reference PN code (h) outputted by the PN code phase control pulse generating circuit 8.

Figure 13:
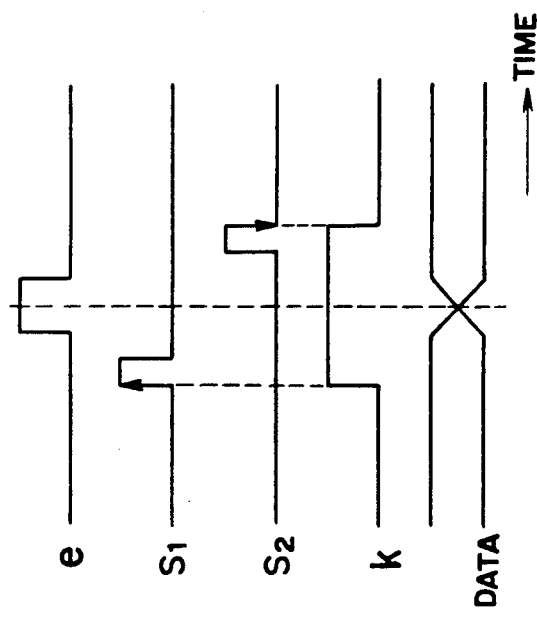
FIG. 13 shows waveforms for explaining the synchronization holding operation and the demodulation in the embodiment indicated in FIG. 11.

As indicated in FIG. 13, the circuit 6 stated above generates sampling pulses $S_1$ and $S_2$ in time before and after the correlation pulse (e) obtained for the normal positional relationship and outputs them to the circuit 7 stated above. The circuit 7 stated above samples always the correlation pulse (e) by using the sampling pulses $S_1$ and $S_2$ to monitor the direction of the deviation of the correlation pulse stated above.

The circuit 7 counts the number of counts by means of an internal counter, every time the sampling is effected. When there is a difference in the number of samplings between the two sampling pulses and this difference reaches a predetermined value, it advances or it outputs a pulse (l) indicating the amount of the deviation due to the delay to the circuit 8 stated above.

The circuit 8 stated above is triggered by the pulse (l) and gives the reference PN code generator 5 a phase control pulse for the reference PN code (h) corresponding to the detected amount of deviation of the correlation pulse by means of the two sampling pulses to control the phase thereof. In this way, the errors in the phase between the two codes are corrected so that the synchronization can be held.

However, in the case where the errors in the code clock frequency between the two codes are remarkable, it is possible that they exceed the limit of the amount of the phase control of the phase control pulse for the reference PN code (h) corresponding to the amount of deviation detected by the two sampling pulse stated above and that the normal synchronization holding operation cannot be performed.

Hereinbelow the synchronization holding operation in the case described above will be explained, taking the positional relationship (B in FIG. 12) as an example, by which the correlation pulse (e) is deviated forward in time with respect to the sampling pulse (j) from the normal positional relationship (A in FIG. 12) in time between the correlation pulse (e) and the sampling pulse (j).

The comparing circuit 44 counts the number of outputs of the pulse (l) indicating the amount of deviation of the lead and the delay outputted by the digital phase lock loop circuit 7. When the number of outputs increases in the lead direction and the number of count reaches the threshold set by the external circuit 45, a lead direction detecting pulse (r) is outputted to the external circuit 45 as the deviation direction detecting pulse. The external circuit 45 then functions as a modifying arrangement which varies the amount of the phase control (s) of the phase control pulse (m) corresponding to the lead tendency detecting pulse (r) outputted by the comparing circuit 44 from one chip set initially to 2 chips.

That is, the amount of the phase, which the phase control pulse (m) of the reference PN code controls, is varied from one chip to two chips as indicated by C and D in FIG. 12.

In this way, it is possible to vary the amount of the phase control for the reference PN code and to hold stably the synchronization by detecting the tendency of the deviation direction of the lead or the delay of the correlation pulse (e) with respect to the sampling pulse (j).

Figure 14:
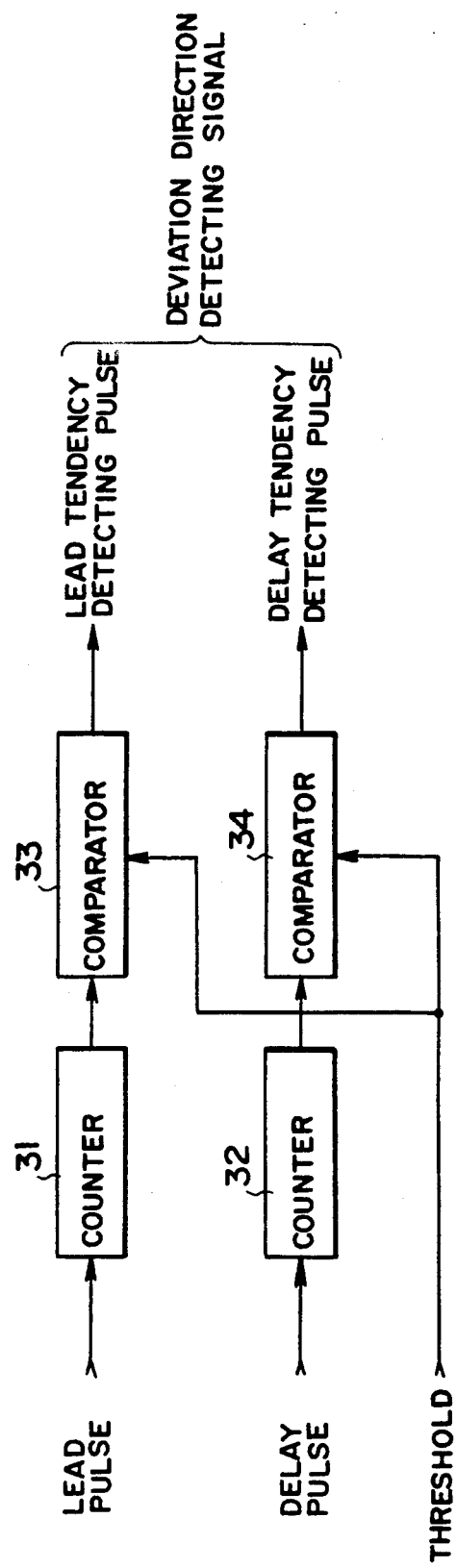
FIG. 14 is a block diagram showing an example of the comparing circuit.

FIG. 14 shows an example of the construction of the comparing circuit 44.

In FIG. 14, reference numerals 31 and 32 are counters and 33 and 34 are comparators. Pulses (l) indicating the amount of the lead and the delay outputted by the digital phase lock loop circuit 7 are inputted in the counters 31 and 32, respectively. Then the counting values are outputted from the counters 31 and 32 to the comparators 33 and 34, respectively. When the counting values outputted by the counters 31 and 32 reach the threshold values set by the external circuit 45, the comparators 33 and 34 output the lead and the delay tendency detecting pulse to the external circuit 45, respectively, as the deviation direction detecting pulse.

As explained above, it is possible to restore correct data by means of the demodulating circuit 9 by performing the initial synchronization in the correlator 1 between the received PN code and the reference PN code and the synchronization holding therebetween, as described below.

As indicated in FIG. 12, the positional relationship between the correlation pulse and the sampling pulses $S_1$ and $S_2$ is held always.

The sampling pulse and window pulse generator 6 generates a window pulse (k) having a width, which is equal to the interval from the rising edge of the sampling pulse $S_1$ to the falling edge of the sampling pulse $S_2$, to output it to the circuit 9 described above, as indicated in FIG. 12. The circuit 9 stated above extracts the correlation pulse (e) by using the window pulse (k) to restore correctly the data.

Figure 15:
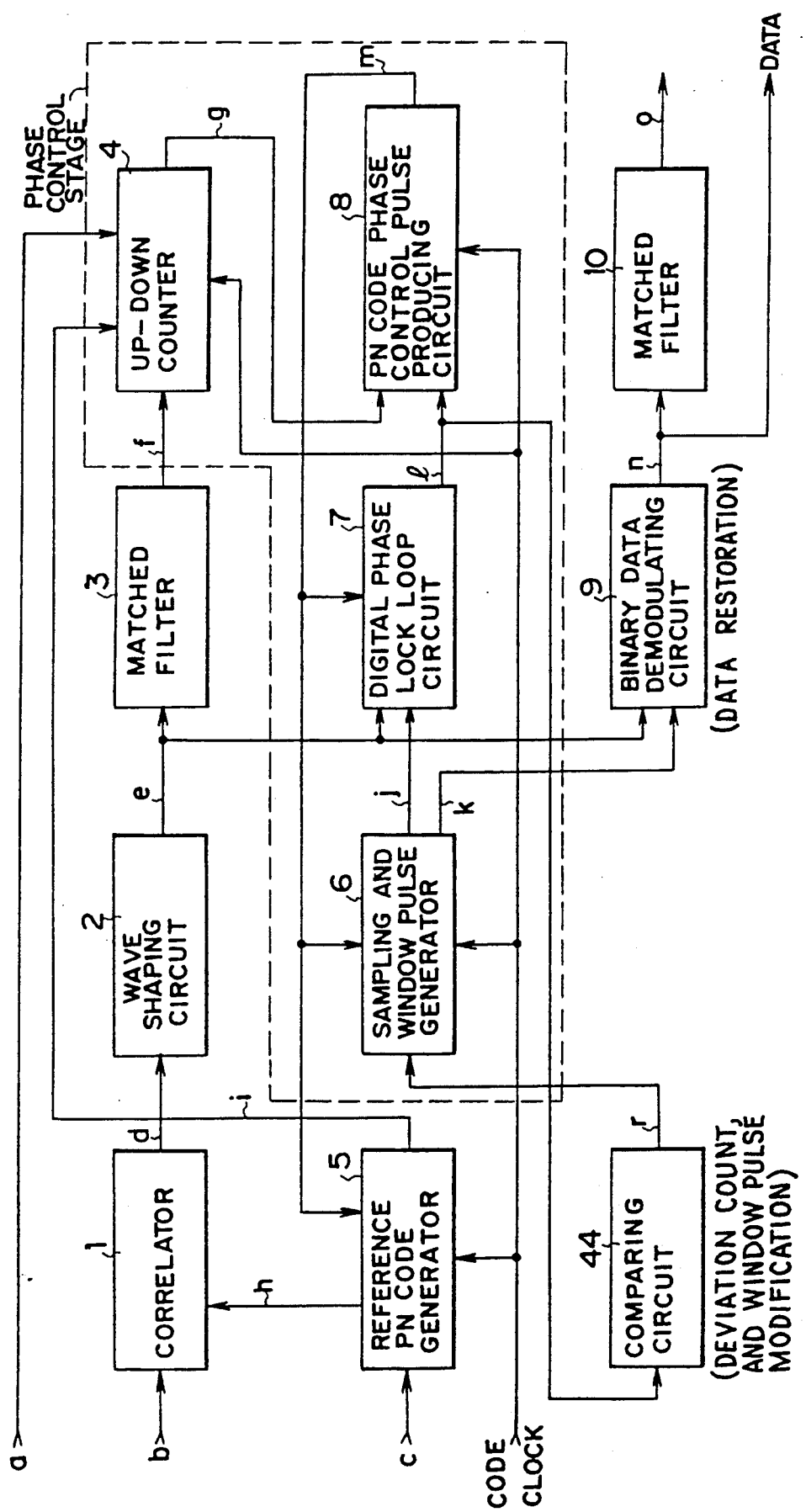
FIG. 15 is a block diagram showing still another embodiment of the present invention.
Figure 16:
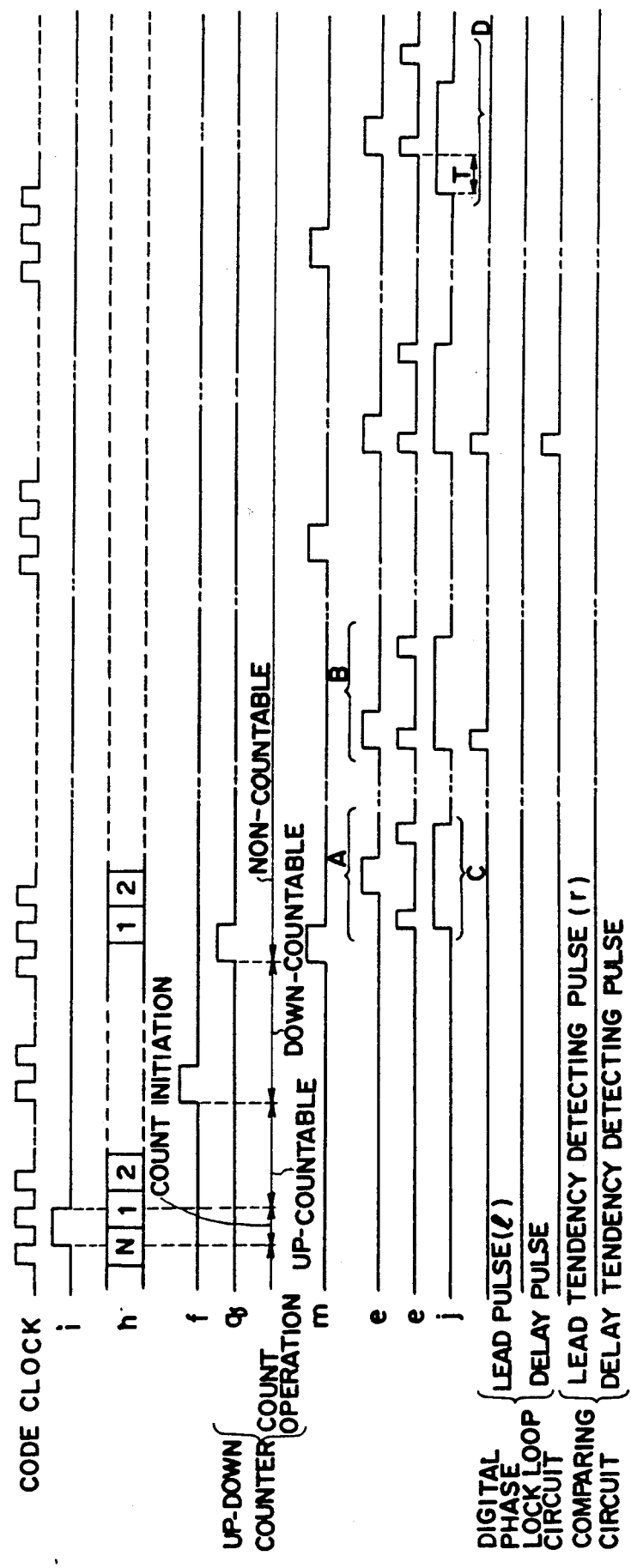
FIG. 16 is a timing chart for explaining the data restoring operation in the embodiment indicated in FIG. 15.

FIG. 15 shows an example of the modification of the embodiment indicated in FIG. 11, which is so constructed that the output r of the comparing circuit 44 is given to the sampling and window pulse generator 6. Hereinbelow only the operations different from those described in the embodiment indicated in FIG. 11 will be explained. FIG. 16 is a timing chart for explaining the initial synchronization operation in the present embodiment.

As explained above, it is possible to restore correct data by means of the demodulating circuit 9 by performing the initial synchronization in the correlator 1 between the received PN code and the reference PN code and the synchronization holding therebetween, as described below.

As indicated in FIG. 12, the positional relationship between the correlation pulse and the sampling pulses $S_1$ and $S_2$ is held always.

The sampling pulse and window pulse generator 6 generates a window pulse (k) having a width, which is equal to the interval from the rising edge of the sampling pulse $S_1$ to the falling edge of the sampling pulse $S_2$ to output it to the circuit 9 described above, as indicated in FIG. 12, and the counters 31 and 32 return to their initial value. The circuit 9 stated above extracts the correlation pulse (e) by using the window pulse (k) to restore correctly the data.

However, in the case where the errors in the code clock frequency between the two codes are remarkable, it is possible that deviations of the correlation pulse (e) indicated in FIG. 12 are produced in either one of the directions towards the sampling pulses $S_1$ and $S_2$ and that the correlation pulse (e) is located in a region, where the extraction by means of the window pulse (k) is unstable.

Hereinbelow the synchronization holding operation in the case described above will be explained, taking the positional relationship (B in FIG. 16) as an example, by which the correlation pulse (e) is deviated forward in time with respect to the sampling pulse (j) from the normal positional relationship (A in FIG. 16) in time between the correlation pulse (e) and the sampling pulse (j).

The comparing circuit 44 counts the number of outputs of the pulse (l) indicating the amount of deviation of the lead and the delay outputted by the digital phase lock loop circuit 7. When the number of outputs increases in the lead direction and the number of count reaches the threshold set by the external circuit, a lead direction detecting pulse (r) is outputted to the external circuit as the deviation direction detecting pulse. The external circuit not shown in the figure varies the timing of the triggering for producing the window pulse (k) corresponding to the lead tendency detecting pulse (r) outputted by the comparator 45 by a period of time T as indicated by C and D in FIG. 16 to hold stably the synchronization.

As explained above, according to the present invention, it is possible to obtain an SSC receiver of packet communication method capable of solving the problem that the operation of the initial synchronization cannot be effected, until the quality of the electromagnetic wave path is restored, when the quality of the electromagnetic wave path is worsened and it is difficult to make the received data pattern be in accordance with a predetermined judgment pattern in the pattern judging means described previously. Further, even in the case where errors in the code clock frequency are remarkable, it is possible to restore correct data by extracting stably the correlation pulse.

While particular embodiments of the present invention have been shown and described, it will be obvious to those skilled in the art that various changes and modifications may be made without departing from the present invention in its broader aspect.

What is claimed is:

1. A spread spectrum communication receiver, comprising:

a reference pseudo noise code generator generating a reference pseudo noise code;

correlating means for obtaining the correlation between a received pseudo noise code included in a received signal and said reference pseudo noise code;

a demodulator responsive to an output of said correlating means for restoring information embodied in said received signal;

pattern judging means for comparing the output of said correlating means with a predetermined first judgment pattern and for producing a detection output when they are in accordance with each other;

means for switching from said first judgment pattern to a second judgment pattern different from said first judgment pattern when said detection output is not obtained in a predetermined period of time; and phase control means for controlling the phase of said reference pseudo noise code on the basis of said detection output to set correctly the phase thereof at which said received pseudo noise code and said reference pseudo noise code are in accordance with each other.

2. A spread spectrum communication receiver according to claim 1 wherein said pattern judging means includes a first matched filter.

3. A spread spectrum communication receiver according to claim 2 wherein said first matched filter includes a shift register circuit, a pulse counter and a comparator connected one after another.

4. A spread spectrum communication receiver according to claim 3 wherein said shift register circuit includes a plurality of shift registers connected in series, each of said shift registers having an output which is applied to said pulse counter.

5. A spread spectrum communication receiver according to claim 4 wherein said pulse counter includes a plurality of half adders and one full adder, each of said half adders having two inputs which are each connected to the output of a respective one of said shift registers, said half adders having outputs which are applied to respective inputs of said full adder.

6. A spread spectrum communication receiver according to claim 1 wherein said phase control means includes an up-down counter, a sampling and window pulse generator, a digital control lock loop circuit, and a pseudo noise code phase control pulse generating circuit connected one after another.

7. A spread spectrum communication receiver, comprising:
a reference pseudo noise code generator generating a reference pseudo noise code;
correlating means for generating a correlation signal representing the correlation between a received pseudo noise code included in a received signal and said reference pseudo noise code;
phase control means for generating two sampling pulses which respectively occur before and after a correlation pulse of said correlation signal outputted by said correlating means, for producing a deviation signal indicating the direction and magnitude of a deviation in time of the correlation pulse of said correlation signal with respect to said sampling pulses, and for controlling the phase of said reference pseudo noise code by applying to said noise code generator a phase control pulse corresponding to said deviation signal;
counting means for counting a number of pulses of said deviation signal; and
means for modifying the amount of phase adjustment of said reference pseudo noise code effected by said phase control pulse outputted by said phase control means on the basis of a count in said counting means.

8. A spread spectrum communication receiver according to claim 7 wherein said phase control means includes an up-down counter, a sampling and window pulse generator, a digital control lock loop circuit, and a pseudo noise code phase control pulse generating circuit connected one after another.

9. A spread spectrum communication receiver according to claim 8 wherein said counting means includes a comparing circuit comparing to a threshold value the number of pulses of said deviation signal indicating the magnitude of deviation.

10. A spread spectrum communication receiver according to claim 9 wherein said means for modifying the amount of the phase control includes an external circuit varying said amount of phase adjustment in response to a deviation direction detection pulse outputted by said comparing circuit.

11. A spread spectrum communication receiver, comprising:
a reference pseudo noise code generator generating a reference pseudo noise code;
correlating means for generating a correlation signal representing the correlation between a received pseudo noise code included in a received signal and said reference pseudo noise code;
phase control means for generating two sampling pulses which respectively occur before and after a correlation pulse of said correlation signal outputted by said correlating means, for producing a deviation signal indicating the direction and magnitude of a deviation in time of the correlation pulse of said correlation signal with respect to said sampling pulses, and for controlling the phase of said reference pseudo noise code by applying to said noise code generator a phase control pulse corresponding to said deviation signal, said phase control means including means for generating a window pulse which rises before and falls after said correlation pulse of said correlation signal;
counting means for counting a number of pulses of said deviation signal;
window pulse modifying means for modifying a timing of said window pulse on the basis of a count in said counting means; and
means for restoring data by extracting said correlation pulse on the basis of said window pulse.

12. A spread spectrum communication receiver according to claim 11 wherein said phase control means includes an up-down counter, a sampling and window pulse generator, a digital control lock loop circuit, and a pseudo noise code phase control pulse generating circuit connected one after another.

13. A spread spectrum communication receiver, comprising:
pseudo noise code generator means for generating a reference pseudo noise code and a strobe signal corresponding to a leading bit of said reference pseudo noise code;
correlator means for correlating a received pseudo noise code contained in a received signal with said reference pseudo noise code to produce correlation spikes;
means for producing a correlated pulse signal having correlation pulses corresponding to said correlation spikes;
demodulator means for demodulating information from said correlated pulse signal;
matched filter means supplied with said correlated pulse signal for judging the similarity between said correlated pulse signal and a predetermined signal pattern and for outputting a judgment signal;
judgment pattern switching means responsive to the absence of said judgment signal throughout a predetermined time period for changing said predetermined signal pattern to a different signal pattern; and
phase control means for measuring the time interval from the occurrence of said strobe signal to the occurrence of said judgment signal and for supplying to said pseudo noise code generator means a phase control signal which adjusts the phase of said pseudo noise code according to said measured time interval.

14. A spread spectrum communication receiver according to claim 13, wherein said phase control means includes an up-down counter, a sampling and window pulse generator having an input coupled to an output of said up-down counter, a digital control lock loop circuit having an input coupled to an output of said sampling and window pulse generator, and a pseudo noise code phase control pulse generating circuit having an input coupled to an output of said digital control lock loop circuit.

15. A spread spectrum communication receiver according to claim 13, wherein said matched filter includes a shift register circuit, a pulse counter having inputs coupled to outputs of said shift register circuit, and a comparator having an input coupled to an output of said pulse counter.

16. A spread spectrum communication receiver, comprising:
    pseudo noise code generator means for generating a reference pseudo noise code and strobe signal corresponding to a leading bit of said reference pseudo noise code;
    correlator means for correlating a received pseudo noise code contained in a received signal with said reference pseudo noise code to produce correlation spikes;
    means for producing a correlated pulse signal having correlation pulses corresponding to said correlation spikes;
    demodulator means for demodulating information from said correlated pulse signal;
    matched filter means supplied with said correlated pulse signal for judging the similarity between said correlated pulse signal and a predetermined signal pattern and for outputting a judgment signal;
    phase control means supplied with said strobe signal and said judgment signal for measuring the time interval from the occurrence of said strobe signal to the occurrence of said judgment signal and for generating a phase control signal which causes said reference pseudo noise code generator means to adjust the phase of said reference pseudo noise code according to said measured time interval, said phase control means including sampling pulse generating means responsive to said phase control signal for successively outputting first and second sampling pulses respectively positioned in time before and after a normal correlation pulse, and including phase lock means supplied with said correlated pulse signal and said sampling pulses for sampling said correlated pulse signal in response to said sampling pulse in order to check for a time deviation of a correlation pulse in said correlated pulse signal from a normal correlation pulse timing and for producing a deviation signal indicative of a detected time deviation, said phase control means by responsive to said deviation signal for generating said phase control signal for said reference pseudo noise code generating means; and
    means for maintaining a count of the number of pulses of said deviation signal, said phase control means generating said phase control signal as a function of said count.

17. The spread spectrum communication receiver according to claim 16, including phase adjustment changing means responsive to said count reaching a predetermined value for generating a phase adjustment signal, said phase control means being responsive to said phase adjustment signal for producing said phase control signal to cause said pseudo noise code generator means to advance the phase of said reference pseudo noise code.

18. The spread spectrum communication receiver according to claim 16, wherein said sampling pulse generating means includes means responsive to said sampling pulses for generating a window pulse which rises before and falls after a normal correlation pulse, said receiver further including window pulse changing means responsive to said count reaching a predetermined value for generating a timing changing signal which causes said sampling pulse generating means to adjust the timing of said window pulse.

19. A spread spectrum communication receiver according to claim 16, wherein said phase control means includes an up-down counter, a sampling and window pulse generator having an input coupled to an output of said up-down counter, a digital control lock loop circuit having an input coupled to an output of said sampling and window pulse generator, and a pseudo noise code phase control pulse generating circuit having an input coupled to an output of said digital control lock loop circuit.

20. A spread spectrum communication receiver according to claim 16, wherein said matched filter includes a shift register circuit, a pulse counter having inputs coupled to outputs of said shift register circuit, and a comparator having an input coupled to an output of said pulse counter.

* * * * *

UNITED STATES PATENT AND TRADEMARK OFFICE
CERTIFICATE OF CORRECTION

PATENT NO. : 5 058 128
DATED : October 15, 1991
INVENTOR(S) : Takao KURIHARA et al It is certified that error appears in the above-identified patent and that said Letters Patent is hereby corrected as shown below:

Column 14, line 8; replace "by" with ---being---.

Signed and Sealed this

Sixth Day of April, 1993

Attest:

STEPHEN G. KUNIN

*Attesting Officer*          Acting Commissioner of Patents and Trademarks